US008060075B2

(12) United States Patent
King

(10) Patent No.: US 8,060,075 B2
(45) Date of Patent: Nov. 15, 2011

(54) MOBILE ADDRESSABILITY WITH MAPPING OF PHONE NUMBERS TO DYNAMIC IP ADDRESSES

(75) Inventor: Simon King, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 787 days.

(21) Appl. No.: 11/695,520

(22) Filed: Apr. 2, 2007

(65) Prior Publication Data

US 2008/0242281 A1 Oct. 2, 2008

(51) Int. Cl.
*H04M 3/00* (2006.01)
(52) U.S. Cl. ............ 455/420; 455/466; 455/412.2; 455/433; 455/456.5; 455/456.6; 370/338
(58) Field of Classification Search .......... 455/433, 455/420, 466, 412.2, 456.5, 456.6; 370/338
See application file for complete search history.

(56) References Cited

U.S. PATENT DOCUMENTS

| | | | |
|---|---|---|---|
| 6,567,419 | B1 | 5/2003 | Yarlagadda |
| 2004/0032860 | A1 | 2/2004 | Mundra et al. |
| 2004/0160979 | A1 | 8/2004 | Pepin et al. |
| 2005/0020234 | A1* | 1/2005 | Iivari et al. ............ 455/403 |
| 2005/0226256 | A1* | 10/2005 | Ando et al. ............ 370/401 |
| 2006/0218268 | A1* | 9/2006 | Beck et al. ............ 709/224 |
| 2006/0277303 | A1* | 12/2006 | Hegde et al. ............ 709/226 |
| 2006/0280175 | A1* | 12/2006 | Kanakasapapathi et al. . 370/389 |
| 2008/0003996 | A1* | 1/2008 | Strandell et al. ............ 455/420 |

FOREIGN PATENT DOCUMENTS

| | | |
|---|---|---|
| EP | 1 161 038 A2 | 12/2001 |
| WO | WO01/78430 | 10/2001 |

OTHER PUBLICATIONS http://en.wikipedia.org/wiki/short_message_service, Oct. 26, 2006.
International Standard ISO/IEC 21989 First edition Jul. 1, 2002, pp. 1-46.
Technical Specification GSM 03.38 v. 7.0.0 (Jul. 1998), Digital Cellular Telecommunications System (Phase 2+); Alphabets and Language-Specific Information, pp. 1-20.

(Continued)

*Primary Examiner* — Kamran Afshar
*Assistant Examiner* — Mong-Thuy Tran
(74) *Attorney, Agent, or Firm* — Frommer Lawrence & Haug LLP; John W. Branch

(57) ABSTRACT

A network device, method, and mobile device are directed towards enabling a computing device to initiate an Internet Protocol (IP) connection with a mobile device using text messaging. The initiating computing device may attempt to contact the mobile device by sending a request to a gateway device. In one embodiment, the request may include a phone number for the mobile device. If an existing IP connection is detected, the gateway device may employ it to establish an IP connection to the initiating computing device. Otherwise, the gateway device may employ the phone number to send a text message to the mobile device. The text message may, in one embodiment, include instructions, or the like, requesting the mobile device to establish an IP connection with the gateway device. The gateway device may then complete the IP connection between the mobile device and the initiating computing device.

18 Claims, 5 Drawing Sheets

OTHER PUBLICATIONS

Technical Specification GSM 4.11 v. 3.3.0 Point-to-Point Short Message Service Support on Mobile Radio Interface, Jan. 1993, pp. 1-73.

Mobile Web Server, OpenSource, 2 pgs, http://wiki.opensource.nokia.com/projects/Mobile_Web_Server, (accessed Feb. 23, 2007).

Wikman et al., "Personal Website on a Mobile Phone", May 24, 2006, 6 pgs, Nokia Research Center Helsinki, http://research.nokia.com/tr/NRC-TR-2006-004.pdf.

Wikman et al., "Providing HTTP Access to Web Servers Running on Mobile Phones", May 24, 2006, 6 pgs, Nokia Research Center Helsinki, http://research.nokia.com/tr/NRC-TR-2006-005.pdf.

Ortiz, "The MIDP 2.0 Push Registry," Jan. 2003, 24 pgs, Sun Microsystems, http://developers.sun.com/mobility/midp/articles/pushreg.

"Session Initiation Protocol," 5 pgs., Wikipedia, http://en.wikipedia.org/wiki/Session_initiation_protocol, (accessed Jul. 26, 2007.)

"Push access protocol," 1 pg, Wikipedia, http://en.wikipedia.org/wiki/Push_access_protocol, accessed Jul. 26, 2007.

Wikman, et al., "Mobile Web Server", O'Reilly European Open Source Convention, Sep. 18-21, 2006, 36 pgs., Brussels, Belgium.

Wilkman, et al., "Mobile Personal Website", 2 pgs., Nokia Research Center, Jun. 19-22, 2006.

\* cited by examiner

MOBILE ADDRESSABILITY WITH MAPPING OF PHONE NUMBERS TO DYNAMIC IP ADDRESSES

TECHNICAL FIELD

The invention relates generally to communications over a network, and more particularly but not exclusively to enabling another computing device to initiate an Internet Protocol (IP) connection with a mobile device using text messaging.

BACKGROUND

Tremendous changes have been occurring in the mobile communication technology that influence our everyday lives. Because of such changes, more people than ever before are using mobile devices to reconnect themselves to their friends, their neighborhood, their community, and even the world. Moreover, many of today's mobile devices have are capable of accessing Internet Protocol (IP) services.

However, while many of the mobile devices may be capable of accessing such IP services, another computing device may be unable to initiate an IP communication with a mobile device. Many mobile devices are unable to accept incoming IP connections, at least in part, because many of these devices employ a dynamic IP address which may not be readily accessible. Another reason why initiating an IP communication with a mobile device from another computing device may not currently function is that at least some of today's network address translations are performed by mobile network operators. Thus, it is with respect to these considerations and others that the invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the invention, reference will be made to the following Detailed Description of the Embodiments, which is to be read in association with the accompanying drawings, wherein.

DETAILED DESCRIPTION

Figure 1:
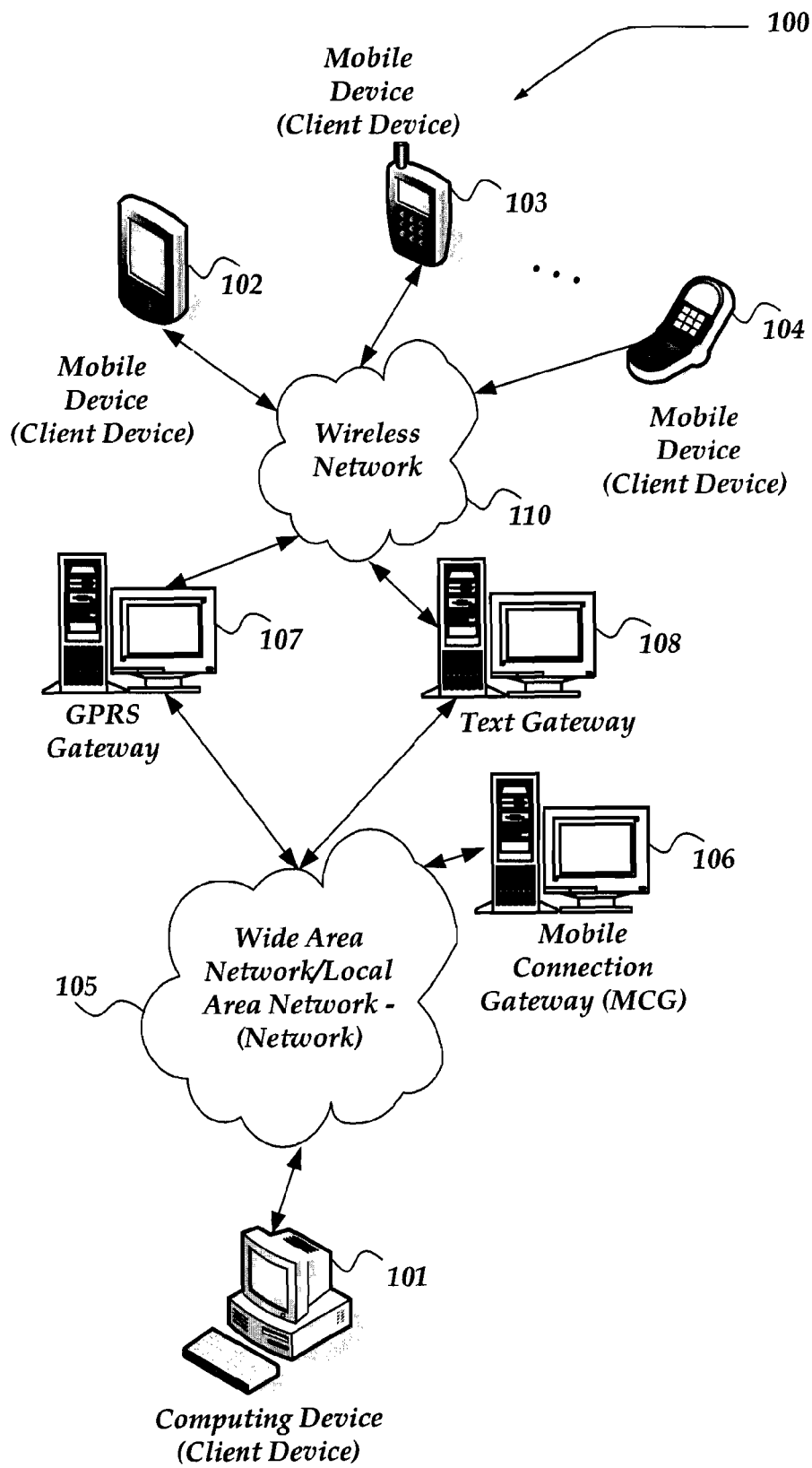
FIG. 1 shows a functional block diagram illustrating one embodiment of an environment in which the invention may operate.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term Short Message Service (SMS) refers to a communication mechanism for providing connectionless transfers of limited size messages between networked devices. SMS messages may be cell broadcast services which are periodically delivered short message to a pre-defined set of computing devices in a given area, or point-to-point services which include short messages sent to a specific user. The SMS protocol is described in more detail in International Standard ISO/IEC 21989, as well as such documents as Global System for Mobile Communications (GSM) 03.38 and 04.11. As used herein, SMS refers to all such Short Message communications, and those derived therefrom.

As used herein, the terms "text messaging," or "text message" refer to SMS messaging, as well as a variety of other limited size message protocols, including, but not limited to Multimedia Messaging Service (MMS) message, or an Enhanced Message Service (EMS) message protocols.

The following briefly describes the invention in order to provide a basic understanding of some aspects of the invention. This brief description is not intended as an extensive overview. It is not intended to identify key or critical elements, or to delineate or otherwise narrow the scope of the invention. Its purpose is merely to present some concepts in a simplified form as a prelude to the more detailed description that is presented later.

Briefly stated, embodiments are directed towards enabling a computing device to initiate an Internet Protocol (IP) connection with a mobile device using text messaging. In one embodiment, the initiating computing device may be a wired computing device, such as a personal computer, a server, or the like. However, in another embodiment, the initiating computing device may also be from a wireless computing device, such as another mobile device.

The initiating computing device may initially attempt to contact the mobile device by sending a request to a mobile connection gateway device. In one embodiment, the request may include a phone number, or the like, for the mobile device. The mobile connection gateway device may employ the phone number to send a text message to the mobile device. The text message may, in one embodiment, include instructions, or the like, requesting the mobile device to establish an IP connection with the mobile connection gateway device. The mobile connection gateway device may then complete the IP connection between the mobile device and the initiating computing device to enable an IP based session to be established. In one embodiment, the mobile connection gateway device and/or the mobile device may monitor the IP connection, and based on various criteria, including, for example, whether the IP connection is idle for some defined time, select to terminate the IP connection.

It should be noted that while a text message is described below for requesting the establishment of an IP connection, the invention is not so limited, and other mechanisms may also be employed, without departing from the scope of the invention. For example, special ping type messages may be sent to the mobile device, a special audio message may be sent, an IM message may be sent, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, mobile devices 102-104, computing device 101, text gateway 108, mobile connection gateway (MCG) 106, and General Packet Radio Services (GPRS) gateway 107.

One embodiment, of mobile devices 102-104 are described in more detail below in conjunction with FIG. 2. Briefly, however, mobile devices 102-104 may include virtually any computing device capable of receiving and sending a message over a network, such as wireless network 110, or the like, to and from another computing device, such as computing device 101, each other, MCG 106, or the like. Client devices 102-104 may include portable devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Client devices 102-104 also may be any computing device that is capable of connecting using a wired or wireless communication medium such as a PDA, POCKET PC, laptop computer, wearable computer, and any other device that is equipped to communicate over a wired and/or wireless communication medium.

Mobile devices 102-104 may also include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 may also be configured to communicate a message, such as through Short Message Service (SMS), Multimedia Message Service (MMS), instant messaging (IM), internet relay chat (IRC), Jabber, email, or the like, between another computing device, such as computing device 101, each other, or the like. However, embodiments are not limited to these messaging protocols, and virtually any other messaging protocol may be employed. For example, mobile devices 102-104 may also be enabled to communicate an audio message using Voice over Internet Protocol (VOIP), or the like.

Mobile devices 102-104 also may include at least one other client application that is configured to provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. Such information may be provided in a message, or the like, sent to GPRS 107, text gateway 108, MCG 106, computing device 101, or other computing devices.

Mobile devices 102-104 may further be configured to include a client application that enables the end-user to log into an end-user account that may be managed by another computing device, such as MCG 106, or the like. Such end-user account, for example, may be configured to enable the end-user to receive and/or send email messages, SMS messages, audio messages, or the like. However, in one embodiment, communications with another computing device may also be performed without logging into the end-user account.

Mobile devices 102-104 may include a client application, script, applet, or the like, that may intercept a received text message and determine if the text message is associated with a request to establish an IP connection with MCG 106, and/or computing device 101, or another mobile device. In one embodiment, the client application, script, applet, or the like, may further monitor the established IP connection to determine whether to terminate it. Termination of the IP connection may be based on a variety of criteria, including, but not limited to the IP connection being idle for a defined time, a voice call interrupt, or the like. Mobile devices 102-104 may employ a process such as described below in conjunction with FIG. 5 to perform at least some of its actions.

Computing device 101 may include virtually any computing device capable of connecting to another computing device and receiving and/or sending information. Such devices may include any computing device that is capable of connecting using a wired communication medium including, but not limited to personal computers, multiprocessor systems, microprocessor-based or programmable consumer electronics, network PCs, and the like. However, computing device 101 is not constrained to such devices, and computing device 101 may also include devices capable of connecting using a wireless communication medium and/or a wireless communication medium, including, but not limited to portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like.

Computing device 101 may include at least one client application that is configured to receive content from another computing device. The client application may include a capability to provide and receive textual content, graphical content, audio content, alerts, messages, and the like. For example, computing device 101 may be configured to communicate a text message, such as through a Short Message Service (SMS), Multimedia Message Service (MMS), instant messaging (IM), internet relay chat (IRC), mIRC, Jabber, and the like, with another computing device. In one embodiment computing device 101 may include a capability to receive text messages and to display the text messages.

Computing device 101 may be configured to establish an IP connection with another computing device, and to communicate information over the IP connection using any of a variety of transport layer protocols of the OSI layered protocol, including but not limited to, for example, Transmission Control Protocol (TCP), Stream Control Transmission Protocol (SCTP), or the like, as well as using a variety of application layer protocols of the OSI layered protocol, including but not limited to HTTP, SMTP, RTP/SIP, FTP, or the like.

Wireless network 110 is configured to couple mobile devices 102-104 with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Moreover, one or more components within wireless network 110 may be managed by one or more carrier service providers that are configured to manage various components for use in communications. For example, although GPRS gateway 107 and text gateway 108 are illustrated as external to wireless network 110, one or both gateways may reside on a border or even within wireless network 110. GPRS gateway 107 and/or text gateway 108 may be managed by one or more wireless and/or wired carrier service providers.

GPRS gateway 107 represents virtually any computing device that may be configured to provide mobility management, session management, and/or transport for IP packet services within a GSM and/or Universal Mobile Telecommunications System (UMTS) network infrastructure, such as wireless network 110 may include. However, it should be clear that the invention is not constrained to employ GPRS, and any wireless IP communication protocols may be employed, without departing from the scope of the invention. For example, CDMA2000 (code division multiple access), 1xEV-DO (Evolution-Data Optimized), 1xEv-DV, High-Speed Downlink Packet Access (HSDPA), or the like, may also be employed within GPRS gateway 107.

GPRS gateway 107 may be further configured to communicate with mobile devices 102-104 using GPRS, or other wireless IP communication protocols, and provide IP connections between mobile devices 102-104 and MCG 106, and/or computing device 101.

Devices that may operate as GPRS gateway 107 include personal computers desktop computers, multiprocessor systems, microprocessor-based or programmable electronics, routers, network PCs, servers, network appliances, or other network device.

Text gateway 108 includes virtually any network device that may be configured to send and receive text messages to or from other computing devices, including, but not limited to mobile devices 102-104, MCG 106, and/or computing device 101. In one embodiment, a received text message may include instructions, a special header, code, short code, or the like, that requests receiving computing device have established an IP connection with another computing device. In one embodiment, a network address, or other identifier of the other computing device may be included in the text message.

Devices that may operate as text gateway 108 include personal computers desktop computers, multiprocessor systems, microprocessor-based or programmable electronics, routers, network PCs, servers, network appliances, or the like.

Network 105 is configured to couple various computing devices with each other, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between one computing device to another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of MCG 106 is described in more detail below in conjunction with FIG. 3. Briefly, however, MCG 106 may include any computing device (or devices) capable of connecting to network 105 to enable a computing device, such as computing device 101, another mobile device, or the like, to initiate an IP based communication with one of mobile devices 102-104. In one embodiment, MCG 106 may be configured to operate similar to a router, or the like, to route IP connections between virtually any computing device, and any of mobile devices 102-104 that has established an IP connection with MCG 106.

In one embodiment, MCG 106 may maintain a data store to map mobile phone numbers, or other identifiers against a list of current mobile IP connections. MCG 106 may receive a request for an IP connection with a mobile device, from such as computing device 101, another mobile device, or the like. If MCG 106 determines that a mobile device identifier for the requested mobile device is not in the list of current mobile IP connections, MCG 106 may automatically send a text message through the mobile device's operator's text gateway, such as text gateway 108 to the requested mobile device, without additional intervention from the requesting computing device. MCG 106 may then receive a request from the mobile device requesting an IP connection to be established. Once an IP connection is established with the mobile device, MCG 106 may then refer at least some IP communications between, such as computing device 101, or the like, and the mobile device over the established IP connection. In one embodiment, an established IP connection may be employed to service requests from multiple computing devices, in addition to computing device 101. In one embodiment, MCG 106 may employ a process such as described below in conjunction with FIG. 4 to perform at least some of its actions.

Devices that may operate as MCG 106 include personal computers desktop computers, multiprocessor systems, microprocessor-based or programmable consumer electronics, network PCs, servers, network appliance, or the like. In one embodiment, MCG 106 may be configured to operate as a network component within a carrier's text messaging system. Thus, while illustrated outside of network 101 or 105, MCG 106 may also operate within network 105 and/or 101, without departing from the scope of the invention.

Furthermore, although FIG. 1 illustrates MCG 106 as a single computing device, the invention is not so limited. For example, one or more functions of MCG 106 may be distributed across one or more distinct computing devices. For example, managing various messaging activities, including test messaging, managing IP connections, or the like, may be performed by a plurality of computing devices, without departing from the scope of the various embodiments.

As a plurality of devices, however, MCG 106 may still appear as a single device to another computing device, such as computing device 101, or the like. This may be achieved using any of a variety of mechanisms, including, but not limited to cluster technologies, peer-to-peer technologies, distributed computing, or the like. In one embodiment, the plurality of devices may also employ load-balancing mechanisms to distribute transactions, requests, or the like. In addition, in one embodiment, a responding device within the plurality of devices may provide a network address, or other identifier to a requesting device, such as computing device 101, to enable a session to be maintained with the same responding device.

Moreover, in one embodiment, actions performed by MCG 106 may also be performed by text gateway 108, and/or GPRS gateway 107.

It is further noted that text gateway 108, and/or GPRS gateway 107 may also be implemented within a plurality of computing devices, employing similar technologies as described above for MCG 106's implementation as a plurality of computing devices.

Illustrative Mobile Client Environment

Figure 2:
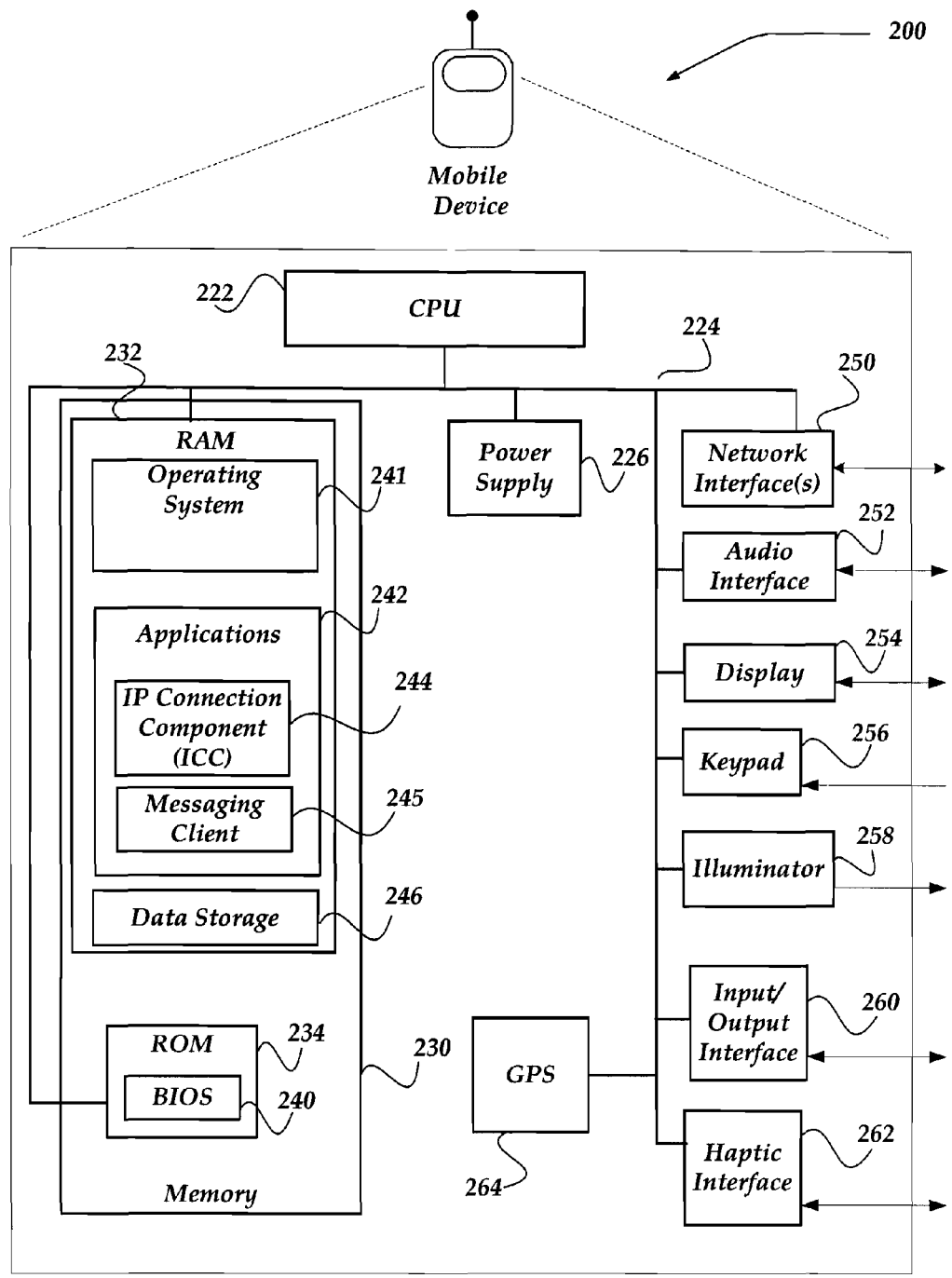
FIG. 2 shows one embodiment of a mobile device that may be employed in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgment for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data stores, which can be utilized by mobile device 200 to store, among other things, applications 242 and/or other data. For example, data storage 246 may be employed to store information that describes various capabilities, mobile device identifier, or the like, of mobile device 200. The information may then be provided to another device based on any of a variety of events, including being sent as part of a header during a communication, sent upon request, or the like. At least a portion of the capability information, and or mobile device identifier, may also be stored on a disk drive or other storage medium (not shown) within mobile device 200.

Applications 242 may include computer executable instructions which, when executed by mobile device 200, transmit, receive, and/or otherwise process audio, video, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using text messages, email, IM, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage emails, VOIP messages, or the like.

Applications 242 may further include IP Connection Component (ICC) 244. ICC 244 may be an application, a script, an applet, a java application, python script, or the like. In one embodiment, ICC 244 may be a downloaded to mobile device 200 from another computing device.

ICC 244 may be configured to intercept a text message received by mobile device 200 and determine whether the text message includes a request for an IP connection with another computing device. If a request for an IP connection is received, ICC 244 may automatically, in one embodiment, without additional user intervention, establish the IP connection with the other computing device. In one embodiment, however, ICC 244 may provide a selection to the user of mobile device 200 to enable the user to accept or deny establishment of the requested IP connection. In any event, ICC 244 may establish the IP connection, in one embodiment, using virtually any socket based connection protocol useable for two-way IP based communications, including, but not limited to telnet, HTTP, FTP, or the like.

ICC 244, in one embodiment, may monitor for text messages, by being associated with a specific port number, socket, or the like. Thus, in one embodiment, ICC 244 may be inactive, until a text message is received on that port, socket, or the like. In another embodiment, ICC 244 may also be configured to become active, and resident, continually monitoring for receipt of text messages.

ICC 244 may also be configured to monitor activity on the IP connection, as well as a variety of other factors, such as cost of the connection, duration of the connection, whether an interfering and/or conflicting communication is being received by mobile device, battery life, connection bandwidth, or the like. Based on activity on the IP connection, and/or other factors, ICC 244 may be configured to terminate the IP connection. In one embodiment, ICC 244 may provide the user of mobile device 200 with an option to terminate the IP connection. In one embodiment, ICC 244 may employ a process such as described below in conjunction with FIG. 5 to perform at least some of its actions.

Illustrative Server Environment

Figure 3:
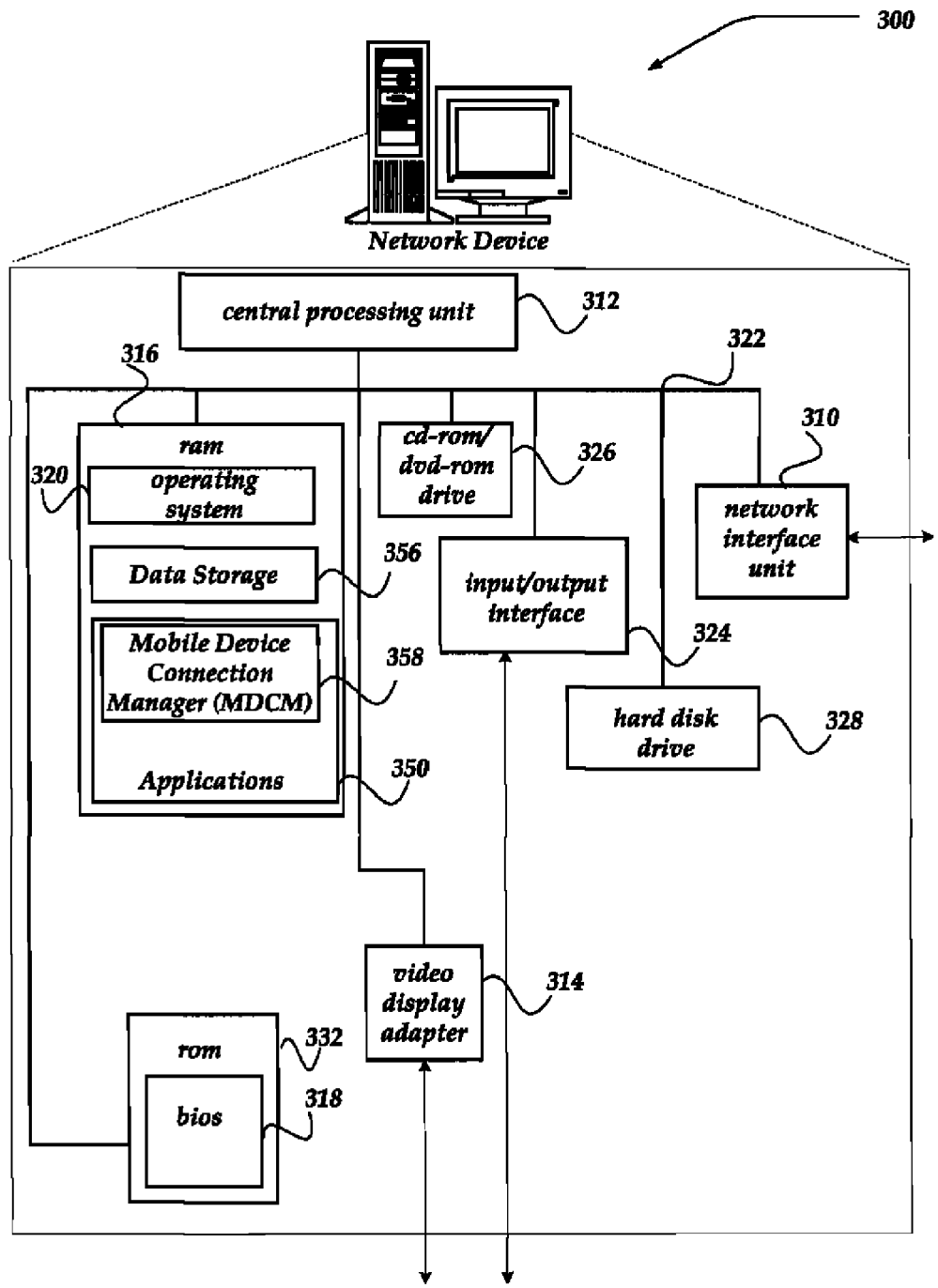
FIG. 3 shows one embodiment of a network device that may be employed in a system.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, MCG 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. In one embodiment, mass memory may include data storage 356 that is configured to store information, including information associated with current IP connections with mobile devices, or the like. In one embodiment, data storage 356 may employ a mobile device identifier, such as a phone number, or the like, to map to a current IP connection with the associated mobile device. In one embodiment, data storage 356 may include a database, script, folder, applet, application, or the like.

One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, text messaging programs, content delivery programs, account management, and so forth. Application programs may also include Mobile Device Connection Manager (MDCM) 358.

MDCM 358 is configured to receive a request for an IP connection with a mobile device. In one embodiment, the request may be received from a wired computing device. However, the invention is not so limited, and the request may also be received from a wireless computing device. MDCM 358 may examine data storage 356 to determine whether an IP connection to the requested mobile device current exists. In one embodiment, MDCM 358 may receive and use a mobile device identifier to determine if an IP connection currently exists to the requested mobile device. The received mobile device identifier may be formatted in a manner that identifies the request is for an IP connection, for example, 4081234567.mobile.yahoo.com, or the like. In one embodiment, another server such as a Domain Name Service Server, MDCM 358, or the like, may employ a data storage, such as data storage 356, to manage *.mobile.yahoo.com addresses.

If MDCM 358 determines an existing IP connection exists with the mobile device, MDCM 358 may employ the existing IP connection to establish an IP based session with the requesting computing device. If MDCM 358 determines that an existing IP connection does not exist, MDCM 358 may automatically send a text message to the mobile device to request that an IP connection be established. MDCM 358 may then wait some period of time for a response from the mobile device. If MDCM 358 does not receive a response with the period of time, MDCM 358 may notify the requesting computing device that the mobile device is currently unreachable.

Once an IP connection is established with a mobile device, in one embodiment, MDCM 358 may be further configured to refer communications from the requesting computing device to the mobile device over the established IP connection. In one embodiment, an established IP connection may be used to service requests from multiple computing devices.

MDCM 358 may also be configured to monitor the IP connection, and based on the IP connection being idle for some period of time, bandwidth concerns, or the like, MDCM 358 may terminate the connection. MDCM 358 may employ a process such as described below in conjunction with FIG. 4 to perform at least some of its actions.

Generalized Operation

Figure 4:
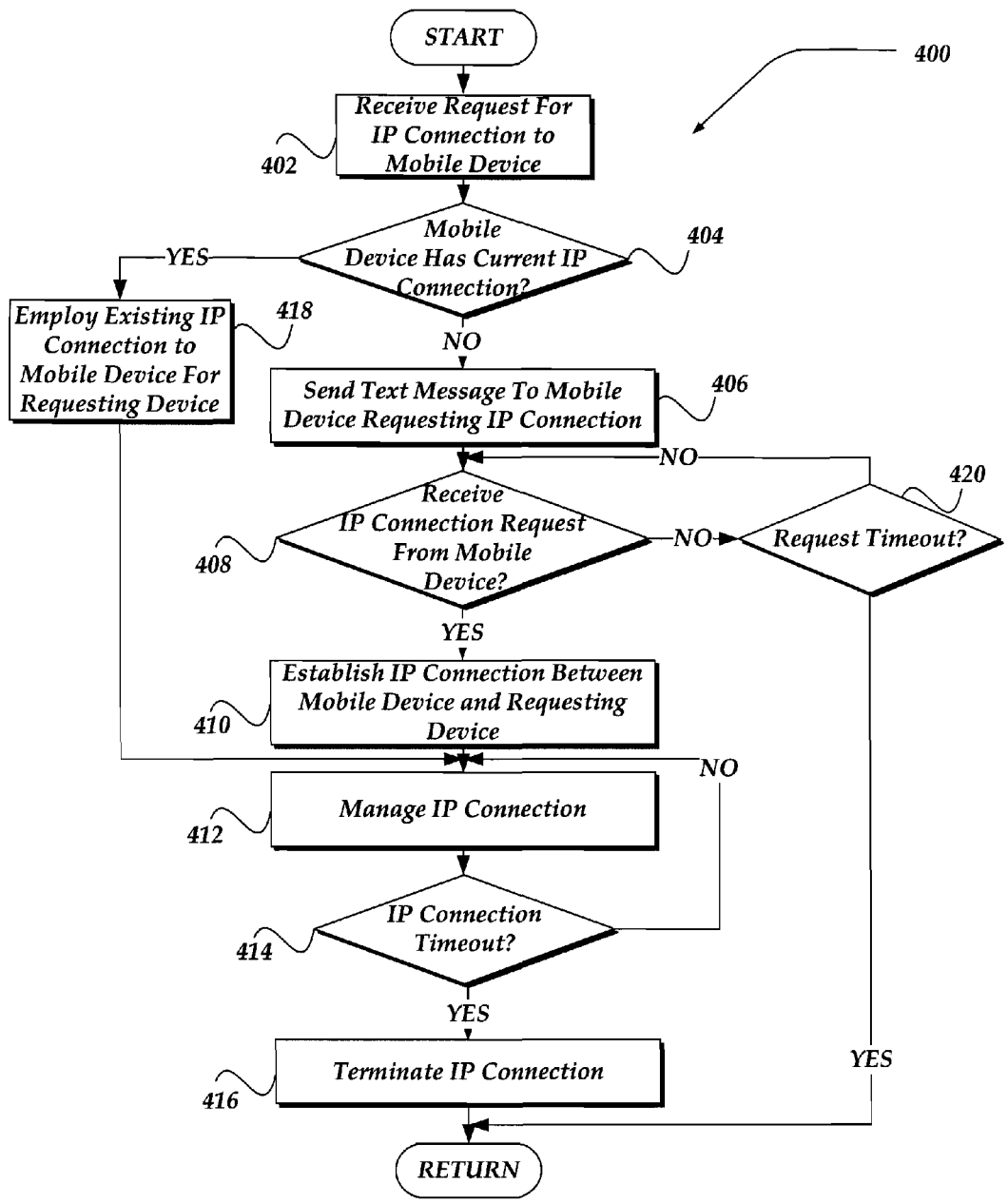
FIG. 4 illustrates a logical flow diagram generally showing one embodiment of a process for enabling IP communications to be initiated from a computing device to a mobile device.

The operation of certain aspects of the embodiments will now be described with respect to FIG. 4. FIG. 4 illustrates a logical flow diagram generally showing one embodiment of a process for enabling IP communications to be initiated from a computing device to a mobile device. Process 400 of FIG. 4 may be implemented, in one embodiment, within MCG 106 of FIG. 1.

Process 400 begins, after a start block, at block 402, where a request for an IP connection with a mobile device is received. In one embodiment, the request may be received from a computing device such as computing device 101 of FIG. 1. However, the request may also come from another mobile device, such as mobile devices 102-104, or the like. In one embodiment, the request may be received over TCP/IP, or other IP connection.

Processing continues to decision block 404, where a determination is made whether an IP connection with the requested mobile device currently exists. In one embodiment, such determination may be performed by examining data storage based on the requested mobile device identifier. If an existing IP connection is found, processing flows to block 418; otherwise, processing continues to block 406.

At block 418, the existing IP connection may be used to establish an IP based session between the requested mobile device and the requesting computing device. Such session may be an HTTP session; however, the invention is not so limited, and virtually any IP based communication protocol may be used. Processing then flows to block 412.

At block 406, however, a text message may be automatically sent to the mobile device request that an IP connection with the requesting computing device be established. In one embodiment, the text message may include instructions, a special short code, defined header, or the like, indicating that the text message is associated with the IP request.

Processing then flows to decision block 408 where a determination is made whether a request for an IP connection is received from the mobile device. Such requests may, in some embodiments include a high latency in initiating the connection. For example, in some of today's configurations, text messages may arrive within seconds. Moreover, in many of today's configurations, there may not be a guaranteed timely delivery. Thus, in one embodiment, if it is determined that a request for establishing the IP connection is not received, processing flows to decision block 420, where a timeout period is examined. If the request for the IP connection is not received from the mobile device within the timeout period, processing may return to a calling process to perform other actions. In one embodiment, a message may be sent to the requesting computing device indicating that the mobile device is currently unreachable. However, if the timeout is not exceeded, processing may loop back to decision block 408, until a request is received from the mobile device, or the timeout is exceeded. If the request is received from the mobile device, processing flows to block 410 where the IP connection may be established with the mobile device.

Processing flows next to block 412, where the IP connection with the requesting computing device may be associated with the IP connection with the mobile device, such that an IP based session may be conducted between the two computing devices.

In one embodiment, the request from the requesting computing device may also include a request for content, or the like, from the mobile device. For example, the requesting computing device may request location information, contents of an address book, calendar, or the like, from the mobile device. In one embodiment, the mobile device may in response provide such information automatically, upon establishment of the IP connection, to the requesting computing device. In one embodiment, permission controls for access of the requested information may be pre-established between the communicating computing devices. In another embodiment, the request from the requesting computing device may include access control information that may be employed to grant/deny access to the requested information.

In any event, processing proceeds to decision block 414, where the IP connection may be monitored to determine whether it has timed-out, whether it has been idle for a defined time period, or the like. In one embodiment, process 400 may also monitor other factors associated with the IP connection, including, but not limited to a bandwidth, a quality of service, or the like. In one embodiment, a decision to terminate an IP connection may be based on a number of currently established IP connections being managed through process 400, a number of idle IP connections, or the like. In one embodiment, an IP connection that has been idle the longest may be selected over another IP connection for termination. However, virtually any criteria may be used to determine whether to terminate an IP connection.

In any event, if it is determined that the IP connection should be terminated, processing flows to block 416; otherwise, processing loops back to block 412. If the IP connection is to be terminated, processing flows to block 416, where the connection may be terminated. Processing then returns to a calling process to perform other actions.

Figure 5:
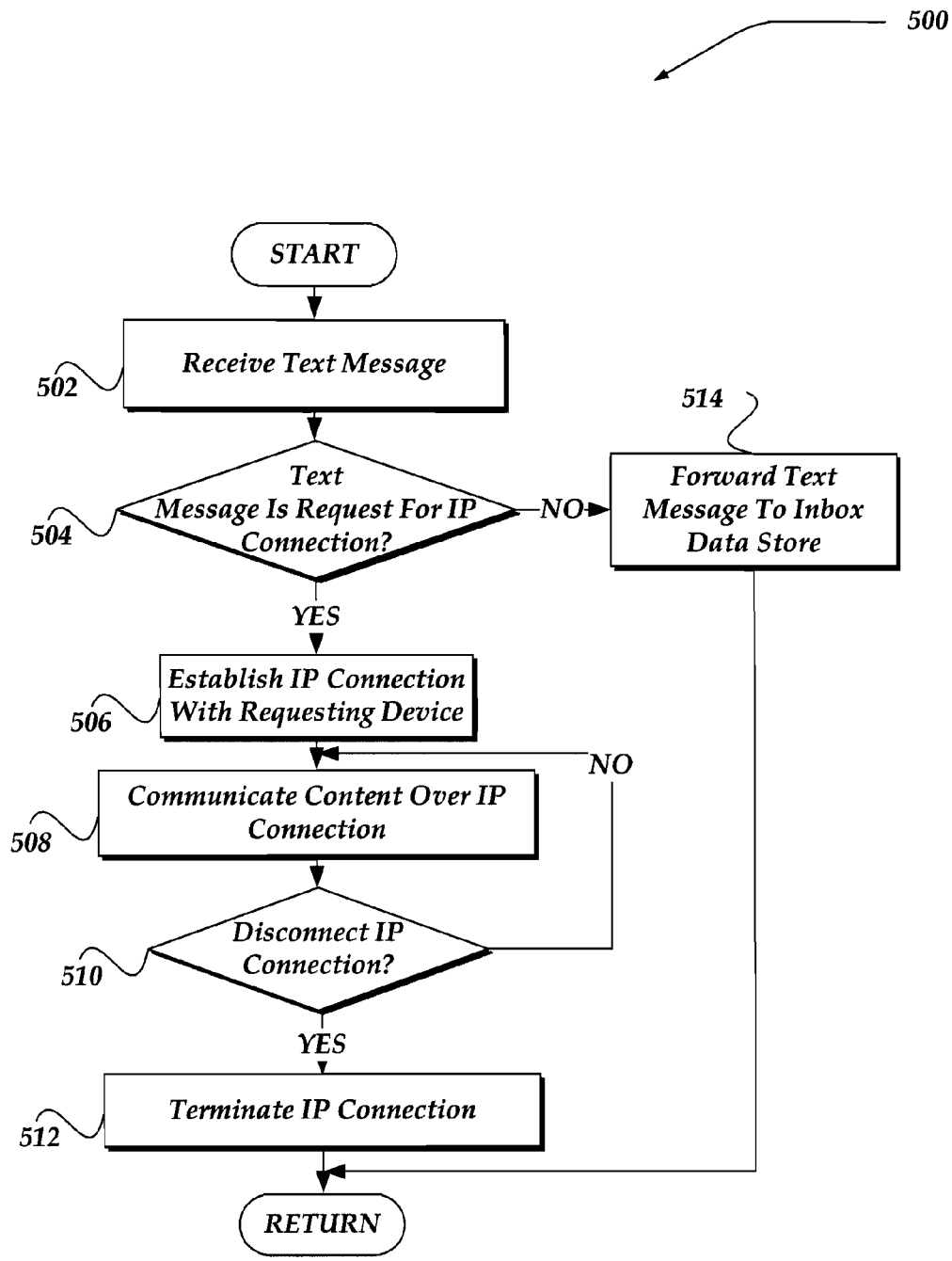
FIG. 5 illustrates a logical flow diagram generally showing one embodiment of a process for a mobile device to establish an IP communications based on a request for the IP communications from another computing device, in accordance with various embodiments.

FIG. 5 illustrates a logical flow diagram generally showing one embodiment of a process for a mobile device to establish an IP communications based on a request from another computing device. Process 500 of FIG. 5 may be implemented in a mobile device, such as mobile devices 102-104 of FIG. 1.

Process 500 begins, after a start block, at block 502, where a text message is received. In one embodiment, the text message may be received at a specific port number, network address, or the like, on the mobile device. In another embodiment, process 500 may be activated upon receipt of the text message. In another embodiment, process 500 may be continually active, monitoring for receipt of a text message.

In any event, when a text message is received, processing may flow to decision block 504, where a determination is made whether the text message is request for an IP connection. In one embodiment, such determination may be performed based on a special code within a subject line of the text message, a short code, an instruction within the message, or the like. In any event, if the message is not to establish an IP connection, processing flows to block 514; otherwise, processing flows to block 506.

At block 514, the text message may be forwarded to a text message inbox, or the like, to enable the user to access the message. Processing then may return to a calling process to perform other actions.

At block 506, the mobile device may send a request to open an IP connection with the requesting computing device associated with the received text message. In one embodiment, the mobile device may request an HTTP connection to be established over a GPRS connection, or other communication protocol. However, the invention is not so limited, and other IP based connections may be requested, including for example, a socket based connection, or the like. In one embodiment, the request may be for a telnet connection, or an FTP connection, or the like. In one embodiment, the IP connection may be encrypted, using any of a variety of encryption mechanisms.

Processing flows next to block 508, where communication of content may be performed over the established IP connection. In one embodiment, the received text message may have included a request for content, location information, or the like. In one embodiment, the response to the request may be sent to the requesting computing device over the IP connection during block 508. In one embodiment, access permission may be examined to determine whether the requested information should be sent. In any event, processing may continue to decision block 510, where a determination is made whether to disconnect the IP connection. Such determination may be based on whether the IP connection is idle for a defined time period, a bandwidth, a quality of service, a battery life, or the like. In one embodiment, the determination may be based on receipt of a communication that may conflict with the IP connection, consume a same and/or a conflicting mobile device resource, network resource, or the like.

In any event, if the IP connection is to be terminated processing moves to block 512. In one embodiment, process 500 may automatically terminate the IP connection without intervention from a user of the mobile device. In one embodiment, another computing device may terminate the connection. In still another embodiment, the user may terminate the IP connection. Processing then returns to a calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A mobile device that is operative to manage a request for a network connection, comprising:
   a memory component for storing data and instructions; and
   a processing component for executing instructions that enables actions, including:
      receiving a text message from an other computing device over other than an IP connection;
      if the text message is associated with a request to establish a currently un-established Internet Protocol (IP) connection with the other computing device, then within an established timeout period, sending a request to establish the IP connection useable to communicate with the other computing device;
      enabling a user of the mobile device to selectively accept or deny establishment of the IP connection with the other computing device;
      receiving an indication that the established IP communication with the other computing device is selectively terminated in part on another communication that is determined to conflict with the established IP connection; and if an other text message is unassociated with a request to establish an IP connection with the other computing device, then forwarding the other text message to a location accessible for review by a user of the mobile device.

2. The mobile device of claim 1, wherein sending the request to establish the IP connection further comprises sending a request to establish an HTTP session with the other computing device.

3. The mobile device of claim 1, wherein the processing component executes instructions that enable actions, further comprising:
monitoring the established IP connection; and
based on a result of the monitoring, selectively terminating the IP connection, wherein the result of the monitoring comprises at least one of whether the IP connection is idle for a defined time, a quality of service status, a bandwidth characteristic, or a request to establish another communication connection within the other communication connection includes a request for a resource that conflicts with or competes with the established IP connection.

4. The mobile device of claim 1, wherein if the text message is associated with the request to establish an IP connection further comprises, examining the text message for at least one of a short code, an instruction, or a defined header.

5. The mobile device of claim 1, wherein receiving a text message from another computing device that is associated with the request to establish an IP connection further comprises, receiving the request if the mobile device does not currently have an existing IP connection established.

6. A non-transitory processor readable storage medium that includes instructions and data, wherein the execution of the instructions provides for managing a network request to a mobile device at a gateway device by enabling actions, including:
receiving a request for an IP connection to the mobile device from an other computing device;
determining if an IP connection to the mobile device is currently established;
if the IP connection to the mobile device is currently un-established:
sending a text message to the mobile device requesting establishment of the IP connection;
in response to sending the text message, receiving a request to establish the IP connection from the mobile device within an established timeout period;
based on the request, establishing the IP connection between the mobile device and the other computing device;
enabling a user of the mobile device to selectively accept or deny establishment of the IP connection with the other computing device;
receiving an indication that the established IP communication with the other computing device is selectively terminated in part on another communication that is determined to conflict with the established IP connection; and
if a response to the text message is not received from the mobile device to establish the IP connection after a defined time, sending a message to the other computing device, indicating that the mobile device is currently unreachable.

7. The non-transitory processor readable storage medium of claim 6, wherein the execution of the instructions enable actions, further comprising:
monitoring the IP connection; and
if based on the monitoring, the IP connection is idle for a defined time, terminating the IP connection.

8. The non-transitory processor readable storage medium of claim 6, wherein sending the text message further comprises including a request for information from the other computing device.

9. The non-transitory processor readable storage medium of claim 6, wherein receiving a request to establish the IP connection from the mobile device further comprises receiving a request to establish at least one of a telnet session, an HTTP session, or other request to establish a socket based connection.

10. A network device to manage a request for a network connection between a mobile device and an other computing device, comprising:
a transceiver to send and receive data over the network; and
a processor that is operative to perform actions, including:
receiving a request for an IP connection to the mobile device from the other computing device;
determining if the IP connection to the mobile device is currently established;
if the IP connection to the mobile device is currently un-established:
sending a message to the mobile device requesting establishment of the IP connection;
in response to the text message, receiving a request to establish the IP connection from the mobile device within an established timeout period;
establishing the IP connection such that the mobile device and the other computing device are enabled to employ the IP connection for communication;
enabling a user of the mobile device to selectively accept or deny establishment of the IP connection with the other computing device;
receiving an indication that the established IP communication with the other computing device is selectively terminated in part on another communication that is determined to conflict with the established IP connections; and
if a response to the text message is not received from the mobile device to establish the IP connection after a defined time, sending a message to the other computing device, indicating that the mobile device is currently unreachable.

11. The network device of claim 10, wherein the request for the IP connection includes a mobile device identifier, and wherein the mobile device identifier is formatter with another identifier indicating, in part, that the request is for an IP connection.

12. The network device of claim 10, wherein the IP connection with the mobile device further comprises an IP connection using, in part, an IP based wireless protocol.

13. A system for use in managing a network connection with a mobile device, comprising:
a mobile device connection manager that is configured to perform actions, including:
receiving a request for an IP connection to the mobile device from an other computing device;
determining if the IP connection to the mobile device is currently established; and
if the IP connection to the mobile device is currently un-established, sending a text message to the mobile device requesting establishment of the IP connection; and
a component on the mobile device that is configured to perform actions, comprising:
receiving the text message;

if the text message is associated with a request for the IP connection, then within an established timeout period, sending a request to establish the IP connection to the mobile device connection manager, wherein the mobile device connection manager enables an IP connection to be established such that an IP based session may be employed over the established IP connection between the mobile device and the other computing device;

enabling a user of the mobile device to selectively accept or deny establishment of the IP connection with the other computing device;

receiving an indication that the established IP communication with the other computing device is selectively terminated in part on another communication that is determined to conflict with the established IP connection; and if an other text message is unassociated with a request to establish an IP connection with the other computing device, then forwarding the other text message to a location accessible for review by a user of the mobile device.

14. The system of claim 13, wherein at least one of the components on the mobile device or the mobile device connection manager is configured to terminate the established IP connection, based on at least one of a bandwidth, a quality of service, or a idle duration of the IP connection.

15. A method of managing a network communication with a mobile device, comprising:

receiving a request for an IP connection to the mobile device from an other computing device;

determining if the IP connection to the mobile device is currently established;

if the IP connection to the mobile device is currently unestablished, sending a text message to the mobile device;

receiving a text message at the mobile device;

if the received text message is associated with the request for the IP connection with the other computing device, then within an established timeout period, sending a request to establish the IP connection with the other computing device from the mobile device;

enabling a user of the mobile device to selectively accept or deny establishment of the IP connection with the other computing device;

receiving an indication that an established IP communication with the other computing device is selectively terminated in part on another communication that is determined to conflict with the established IP connection; and if an other text message is unassociated with a request to establish an IP connection with the other computing device, then forwarding the other text message to a location accessible for review by a user of the mobile device.

16. The method of claim 15, further comprising:

if the IP connection to the mobile device is currently established, employing the established IP connection to enable an IP based session between the mobile device and the other computing device.

17. The method of claim 15, wherein the request for an IP connection received from the other computing device further includes a request for information from the mobile device.

18. A non-transitory processor readable storage medium configured to store program instructions that when executed perform the method of claim 15.

* * * * *

UNITED STATES PATENT AND TRADEMARK OFFICE
CERTIFICATE OF CORRECTION

| | | |
|---|---|---|
| PATENT NO. | : 8,060,075 B2 | |
| APPLICATION NO. | : 11/695520 | |
| DATED | : November 15, 2011 | |
| INVENTOR(S) | : King | |

It is certified that error appears in the above-identified patent and that said Letters Patent is hereby corrected as shown below:

On the Title Page, item (56), under (Other Publications), in column 2, line 3, delete "21989" and insert -- 21989, -- , therefor.

In column 16, line 1, in Claim 7, delete "if" and insert -- if, --, therefor.

In column 16, line 39, in Claim 10, delete "connections;" and insert -- connection; --, therefor.

In column 16, line 47, in Claim 11, delete "formatter" and insert -- formatted --, therefor.

Signed and Sealed this
Twelfth Day of June, 2012

David J. Kappos
*Director of the United States Patent and Trademark Office*